though the dispensing nozzle.

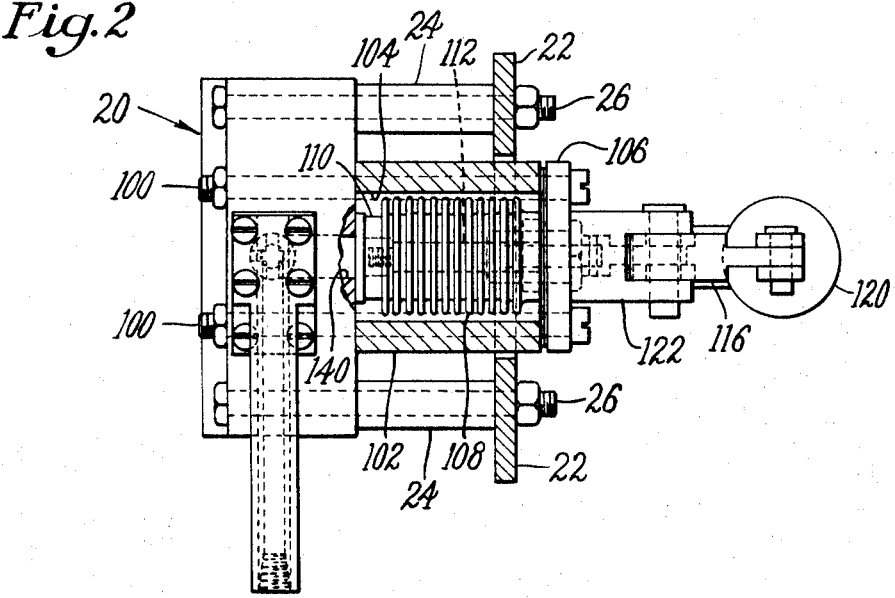
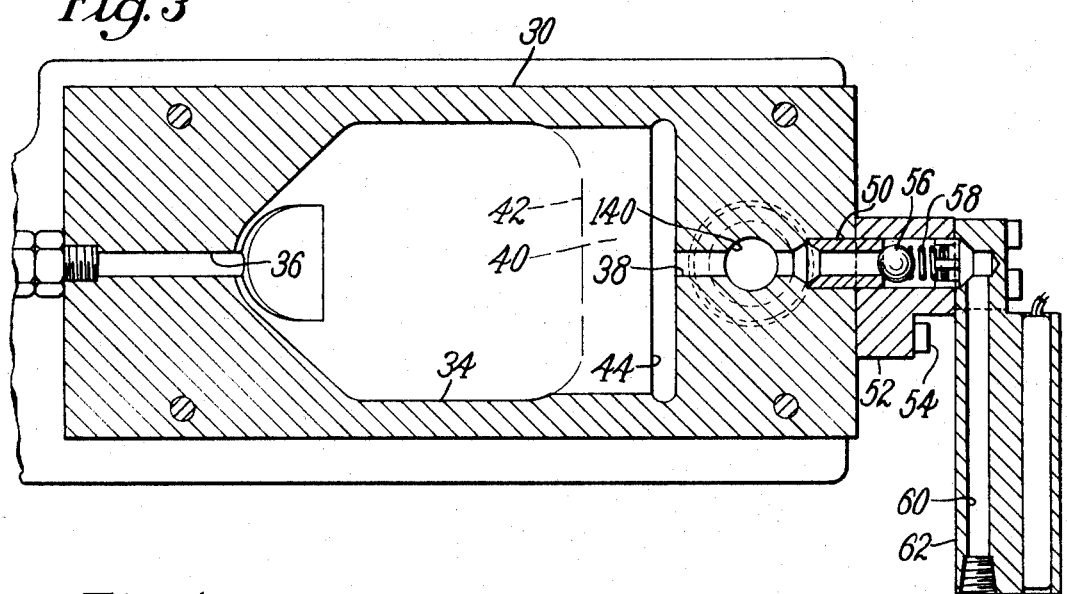
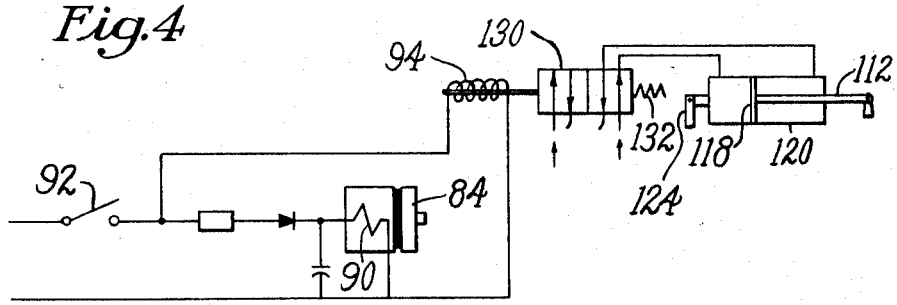

United States Patent Office 3,386,625
Patented June 4, 1968

3,386,625
APPARATUS FOR MELTING AND DISPENSING
THERMOPLASTIC MATERIAL
Roland B. Lessard, Salem, Mass., assignor to United Shoe
Machinery Corporation, Boston, Mass., a corporation
of New Jersey
Filed Dec. 9, 1966, Ser. No. 600,460
2 Claims. (Cl. 222—146)

ABSTRACT OF THE DISCLOSURE

Apparatus for melting and dispensing molten thermoplastic material supplied in the form of a solid rod which comprises a heated melt body formed with a melt chamber having an inlet passage and an outlet passage, a dispensing nozzle in communication with the outlet passage and a pair of feed wheels for feeding the leading end of a solid rod of thermoplastic material through the inlet passageway and into the melt chamber to cause the leading end of the rod to be melted and molten thermoplastic material to be forced through the outlet passageway and extruded through the dispensing nozzle.

Background of the invention

This invention relates to apparatus for melting and dispensing molten thermoplastic material and is herein illustrated as embodied in apparatus of the type shown in U.S. Patent No. 3,314,573, granted Apr. 18, 1967 on a U.S. application in the name of Albert E. Newton for melting and dispensing molten thermoplastic material supplied in the form of a solid rod. It will be understood, of course, that in its broader aspects the features of the invention are not limited to embodiment in apparatus of this particular type or to the exact mechanical construction shown.

Apparatus of the type shown in the aforementioned application has proved to be quite satisfactory in operation, especially when used under conditions where a continuous flow of molten material, such as thermoplastic adhesive, is required. However, where more or less intermittent action is needed, there is a tendency, during standby periods when the rod feed mechanism is stopped, for the leading end of the solid rod within the melt chamber to become molten and all of the molten material therein to expand. As a result of such expansion, molten material tends to continue to be extruded out through the discharge nozzle and also to be forced back along the inlet passage. Accordingly, considerable amounts of rather costly thermoplastic material are wasted and accurate cutoff of the extrusion of the adhesive is not obtained. On the other hand, where the thermoplastic material is of a composition such as to throw off gases when heated, voids will be created within the molten material in the melt chamber which will cause a slight time lag, when the rod feed mechanism is again set into operation, before full flow is attained through the discharge or outlet passage.

Summary of the invention

It is an object of this invention to provide a novel and improved apparatus for melting and dispensing molten thermoplastic material, such as an adhesive, wherein the aforementioned difficulties are entirely avoided and improved response is obtained. With this purpose in view, and in accordance with features of the invention, the herein illustrated apparatus, which has a body formed with a chamber, an outlet passage, a dispensing device connected to the outlet passage, means for delivering molten material from the chamber through the outlet passage and dispensing device and means for starting and stopping the action of the molten material delivering means, is also provided with means for withdrawing molten thermoplastic material from the melt chamber and outlet passage when the delivering means is stopped and for returning the molten material so withdrawn to the outlet passage when the delivering means is again started. More particularly, the herein illustrated apparatus has a melt body provided with a melt chamber, an inlet, means for feeding the leading end of a solid rod of thermoplastic material through the inlet and into the melt chamber thus to cause molten material to be forced out through the outlet chamber and extruded through the dispensing device, means for starting and stopping the rod feeding means and is provided with a chamber in communication with the outlet passage and having a movable wall together with means for effecting movement of said wall to increase the volume of the chamber when said rod feeding means is stopped and to return the wall to its original position, thus restoring the chamber to its original volume when the rod feed means is again started.

The above and other objects and features of the invention will appear in the following detailed description of the preferred embodiment illustrated in the accompanying drawings and will be pointed out in the claim.

Brief description of the drawings

In the drawings:

FIG. 2 is a view in end elevation of the apparatus shown in FIG. 1 with certain parts shown in vertical section;

FIG. 3 is a view in section of a portion of the apparatus substantially on line III—III of FIG. 1 and looking in the direction of the arrows; and FIG. 4 is a diagrammatic view of the electrical and pneumatic control system of the apparatus.

Description of the preferred embodiment

Figure 1:
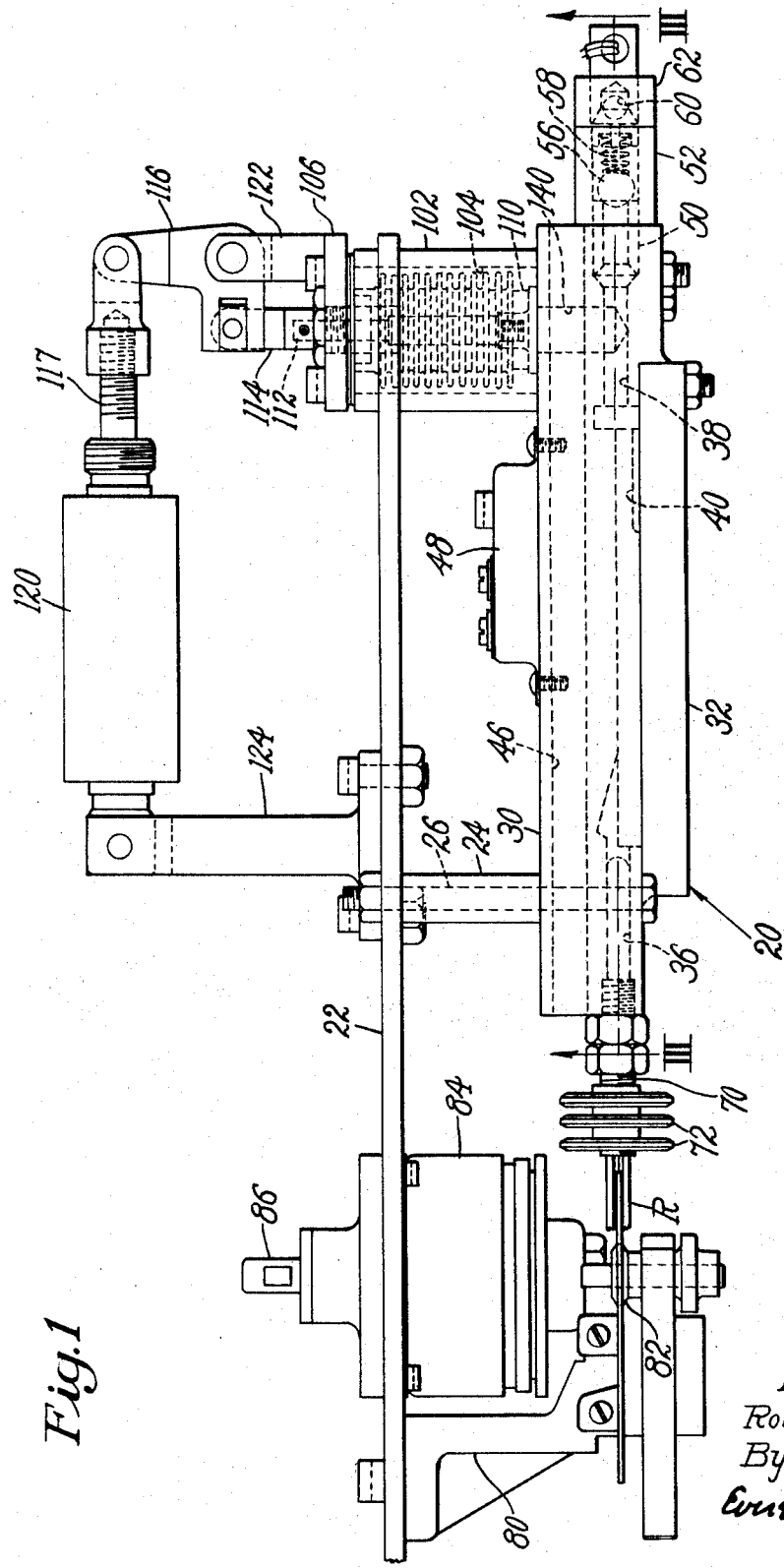
FIG. 1 is a view in plan of a melting and feeding apparatus embodying the features of this invention.

Referring to the drawings and particularly to FIG. 1, the apparatus shown therein comprises a melt body indicated generally by the reference character 20 which is mounted on a main supporting plate 22 by means of spacer blocks 24 and bolts 26, see also FIG. 2. The melt body comprises a main portion 30 and a cover 32. Formed in the main body portion is a recess 34 of the shape shown in FIG. 3, an inlet passage 36 and an outlet passage 38. The cover 32 is provided with a raised portion 40, FIG. 1, of a shape indicated in FIG. 3 by a broken line 42 the two opposite sides of the recess 34 and one edge of a groove 44, formed in the body portion 30 and communicating with the outlet passage 38. The body portion is also provided with a longitudinal bore 46 for the reception of a suitable electrical heating element, not shown, the action of which may be controlled by a thermostat 48, so as to maintain the temperature of the melt body at a desired level.

The outlet passage 38 is connected by means of a sleeve 50 to a valve block 52, which is secured to the melt body by means of a screw 54. Located within this valve block is a ball check valve 56 adapted to open, against the resistance of a spring 58, to connect the sleeve and outlet 38 with a passageway 60 formed in a nozzle block 62. At its lower end, the passageway 60 is threaded to receive a nozzle, or similar dispensing device, not shown. Threaded into the left-hand end of the inlet passage 36 is an inlet tube 70 on which there are mounted several heat dissipating discs 72, 72.

Secured to the supporting plate 22 is a bracket member 80 and mounted on this bracket member is mechanism for feeding the leading end of a solid rod R of thermoplastic adhesive through the inlet tube 70, inlet passage 36 and into the melt chamber formed in the body 20 by the recess 34 and cover 32. This rod feed mechanism is similar to that shown, for example, in U.S. Letters Patent No. 3,255,727 issued June 14, 1966 and includes a pair of feed wheels, the upper-most one of which is shown in the drawings, FIG. 1, and indicated by the reference character 82, a magnetic clutch indicated by reference characted 84 and having an input shaft 86 adapted to be connected to a suitable source of power such, for example, as an electric motor, not shown.

When this apparatus is in use, the electric motor will run continuously and upon energization of the coil 90 of the magnetic clutch, as by the closing of a switch 92, FIG. 4, manually or automatically, the feed wheels will be driven and the leading end of the rod R will be led into the chamber in the melt body where it will be melted and molten adhesive will be forced out through the outlet passage 38, sleeve 50, past the valve 56 and through the passageway 60 to the nozzle, by the force exerted on the molten adhesive by the entering solid rod acting as a piston. Upon the opening of the switch 92 the feed wheels will immediately come to a stop as the coil 90 is de-energized.

Because of the continued action of the heated body 20, when the rod feed mechanism is stopped, the solid leading end of the rod R melts in the chamber of the melt body, back through the inlet passage 36 and into the inlet tube 70 to a point where further melting is inhibited by the cooling action of the discs 72, 72. Also, the molten adhesive within the chamber of the melt body tends to expand and inasmuch as the leading end of the rod R more or less effectively prevents escape of molten adhesive through the inlet tube 70, the valve 56 will be lifted and molten adhesive will flow through the outlet 38, sleeve 50 and passageway 60 and eventually will be extruded through the nozzle, or other dispensing device. Such extrusion, or drooling of molten adhesive from the nozzle during so-called stand-by periods is objectionable not only from the standpoint of economy, but also because it is quite messy.

To avoid this difficulty and also to improve the response characteristics of this apparatus, the following arrangement is provided. Secured to the melt body 30, by means of bolts 100, 100 is a block 102 having a central cylindrical bore 104 and a cover plate 106, FIG. 2. Secured to the cover plate and extending into the bore 104 is a sylphon bellows 108 carrying at its lower end a plunger 110. Secured to this plunger and extending through the cover plate 106 is a piston rod 112. A link 114 connects this piston rod to one arm of a bell crank lever 116 the other arm of which is connected to the rod 117 of a piston 118 contained within a cylinder 120, FIGS. 1 and 4. This bell crank lever is pivotally mounted on an ear 122 formed integrally with the cover plate 106 while the cylinder 120 is pivotally mounted on a bracket 124 mounted on the supporting plate 22.

As shown in FIG. 4, the flow of pressure fluid to an exhaust from the opposite ends of the cylinder 120 is controlled by a reversing valve 130. This valve is adapted to be shifted to one position in which pressure fluid is admitted to the right hand end of the cylinder 120, by means of the armature of a solenoid having a coil 94 when this coil is energized and to its other position, in which pressure fluid is admitted to the left hand end of the cylinder, by means of a spring 132 when coil 94 is de-energized. The coil 94 is in series with the coil 90 and switch 92. Accordingly, when the feed rolls are started, as a result of the energization of the coil 90 by the closing of the switch 92, the coil 94 will also be energized and fluid under pressure will be admitted to the right hand end of the cylinder 20. The piston 118 will now be moved to the left and the plunger 110 will assume the position shown in FIGS. 1 and 2 in which it entirely covers one end of a bore 140 formed in the melt body 22 and intersecting the outlet passageway 38, FIGS. 1, 2 and 3.

On the other hand, when the feed wheels are stopped, as a result of the opening of the switch 92, coil 94 will also be de-energized and the valve 130 will be shifted by its spring to the position shown in FIG. 4 to cause the piston 118 to be moved to the right thus elevating the plunger 110. As this plunger is elevated, before the check valve closes, a small amount of molten adhesive will be withdrawn from the passageway 60, thus relieving pressure at the nozzle and preventing drooling therethrough. Also, some molten adhesive will be withdrawn from the melt chamber within the body 22, this amount being at least as great as, and preferably slightly greater than the expected volumetric expansion of the molten material to occur during the stand-by period. Thus, as the molten material expands within the chamber in the melt body, no pressure will be exerted on the ball check valve 56 nor will there be any tendency for molten material to be forced outwardly through the inlet passage 36 and inlet tube 70 by the expanding molten adhesive. However, when the rod feed mechanism is again put in operation, the molten adhesive previously withdrawn will quickly be returned to the outlet passage 38 by the descending plunger 110, thus assuring an immediate flow of molten adhesive out through the nozzle, or other dispensing device which is connected to the passageway 60.

Having thus described my invention, what I claim as new and desire to secure by Letters Patent of the United States is:

1. Apparatus for melting and dispensing molten thermoplastic material comprising a melt body formed with a melt chamber, an inlet passageway for receiving a solid rod of thermoplastic material and an outlet passageway, a dispensing device connected to the outlet passageway, means for heating the melt body, means for feeding the lead end of said solid rod through the inlet passageway and into said melt chamber to cause the leading end of the rod to be melted into molten thermoplastic material to be forced through the outlet passage and extended through the dispensing device, means for starting and stopping the rod feeding means and means for withdrawing molten material from the melt chamber and outlet passage when the rod feeding means is stopped and for returning the molten material so withdrawn to the outlet passage when the rod feed means is again started, said last-named means includes a chamber of variable volume in communication with the outlet passage and means for increasing the volume of this chamber with the rod feed means is stopped and for restoring it to its original volume when the rod feed means is again started.

2. Apparatus for melting and dispensing molten thermoplastic material comprising a melt body formed with a melt chamber, an inlet passageway for receiving a solid rod of thermoplastic material and an outlet passageway, a dispensing device connected to the outlet passageway, means for heating the melt body, means for feeding the lead end of said solid rod through the inlet passageway and into said melt chamber to cause the leading end of the rod to be melted into molten thermoplastic material to be forced through the outlet passage and extended through the dispensing device, means for starting and stopping the rod feeding means and means for withdrawing molten material from the melt chamber and outlet passage when the rod feeding means is stopped and for returning the molten material so withdrawn to the outlet passage when the rod feed means is again started, the last-named means includes a chamber in communication with the outlet passage and having a movable wall, and means for effecting movement of said wall to increase the volume of the chamber when the said means is stopped and to return the wall to its original position, thus restoring the chamber to its original volume when the rod feed means is again started.

(References on following page)

References Cited

UNITED STATES PATENTS

| | | | |
|---|---|---|---|
| 2,096,499 | 10/1937 | Mandell | 141—117 XR |
| 2,174,319 | 9/1939 | Gastrow | 222—146 |
| 2,407,208 | 9/1946 | Sherwood | 222—146 XR |
| 2,721,008 | 10/1955 | Morgan | 222—571 XR |
| 2,888,046 | 5/1959 | Piazze et al. | 141—117 |
| 3,228,566 | 1/1966 | Knox | 222—146 |
| 3,255,727 | 6/1966 | Boothroyd | 118—7 |

WALTER SOBIN, *Primary Examiner.*